Sept. 10, 1940.   P. F. ZIEGLER ET AL   2,214,007
CREPED PRESSURE-SENSITIVE ADHESIVE MATERIAL
Filed Feb. 5, 1938
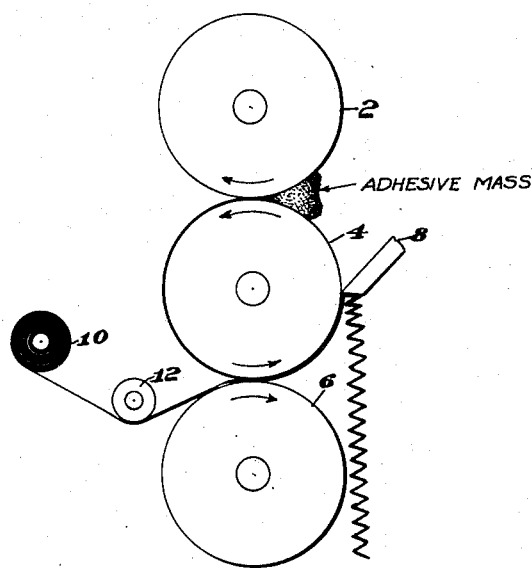
INVENTORS
Paul F. Ziegler
BY Karl Cedric Hoaglund
H. L. Kirkpatrick
ATTORNEY Patented Sept. 10, 1940

2,214,007

UNITED STATES PATENT OFFICE 2,214,007

CREPED PRESSURE-SENSITIVE ADHESIVE MATERIAL

Paul F. Ziegler, Winnetka, and Karl Cedric Hoeglund, Chicago, Ill., assignors to The Kendall Company, Boston, Mass., a corporation of Massachusetts Application February 5, 1938, Serial No. 188,902

11 Claims. (Cl. 154—43)

This invention relates to a creped, pressure-sensitive adhesive material, and particularly to a material of the type employed principally as masking tape, though it is also employed for various other useful purposes.

The typical, commercial, pressure-sensitive adhesive material comprises a creped paper backing having an adhesive on one side thereof forming an applying medium for the material. Such products have certain definite features arising from the creped backing used, and from the intrinsic character of the adhesive. Thus, since the paper is creped before the adhesive is applied, the adhesive is co-extensive with an area less than the total area of the backing and, as the paper has certain overlappings as the result of the creping, the adhesive tends to attach the overlappings to each other, so that when the creped product is stretched, as the overlappings extend, particular strain is imposed upon the adhesive, causing either fracture of portions of the adhesive from the backing leaving such portions unattached, or even fracture of the adhesive itself leaving areas of backing actually exposed.

Also, because the typical commercial pressure-sensitive adhesive material includes a previously creped paper, it has been necessary to use a relatively non-viscous liquid adhesive, so that, when applied, it will easily flow and cover the rugosities of the previously creped paper. Products so made are expensive because of the necessity of the initial presence of a solvent with its incident waste and danger, if inflammable. The use of a solvent also imparts to the product certain uncontrolled and undesired characteristics, which are inherent in a solvent-laid pressure-sensitive adhesive product, both because of the action of the solvent in wetting the backing on application, and particularly because of the action of the solvent on the adhesive itself.

The product of this invention is a creped material comprising a backing sheet combined with a sheet of pressed-on pressure-sensitive material as distinguished from a layer of solvent-laid adhesive, the two combined sheets having substantially co-extensive crepings; the adhesive material being applied as a pre-formed sheet having a relatively high elasticity and plasticity. In this product, the adhesive mass may comprise a completely overlying sheet which maintains its separate identity after the co-extensive creping of both to overcome the hereinbefore referred to overlapping difficulties of the type of product made heretofore with a paper creped before application of a solvent-laid liquid adhesive.

Furthermore, the product of this invention may have an applied adhesive sheet which not only has a relatively high strength or intrinsic high initial resistance to flow, evident in the completed product as an inherent capacity against crawling or creeping relative to an external surface, but one which also provides a pressure-sensitive adhesive product having a relatively low aging rate, while including adequate tack.

This low aging rate, is not approached in a product made from a solvent-laid adhesive, and the reason for the marked superiority in this respect is readily understood by those skilled in the art. In a solvent-laid adhesive, the introduction of a solvent, particularly an organic solvent, into the rubber has a well known action of swelling and dispersing the rubber molecules into the solution, and during this action the rubber is uncontrollably depolymerized. When spread, the texture of the adhesive upon evaporation of the solvent is such that noticeable oxidation of the rubber occurs in a comparatively short time. The marked inferiority of the aging quality of a solvent-spread adhesive is probably directly due to the entirely different physical characteristics arising from the different molecular structure present in a solvent-laid film, resulting from the comparatively high degree of solvation and resulting depolymerization uncontrollably caused by the action of the solvent on the rubber.

In accordance with our invention, a pre-formed sheet of pressure-sensitive adhesive material may be formed from rubbery vinyl polymers, such as crude rubber, rubber derivatives, natural or synthetic, Neoprene (a halogen substituted butadiene polymer), or from synthetic polymers having rubbery characteristics, such as Thiokol (a polyalkylene sulfide), suitably treated, as by milling to secure the desired viscous and plastic properties to permit formation of a sheet thereof, which can be subsequently applied, as a sheet, to a sheet backing and then the combined laminated product creped as hereinafter set forth.

For instance, in the case of an adhesive consisting essentially of rubber, which we preferably employ, the applied pressure-sensitive material may be formed of what is technically known as a plasticized crude rubber compound. Such a rubber compound may be more fully described as one which has been brought to the desired state of plasticity and tack for application as a sheet to the backing and has been applied to the backing so that, in its applied form, it does not evidence the reduced aging quality effected by substantial depolymerizing action of solvents. For example, the preliminary treatment to incorporate the necessary or desirable plasticizers, such as rosin, with or without other plasticizers and either with or without zinc oxide, may be accomplished by a process of dry milling. Preferably, the milling is maintained for a period only just sufficient to secure complete intermixture of the ingredients, and preferably under conditions which otherwise aid in minimizing depolymerizaton of the rubber, such as on a heated mill, in order to secure in the final product an adhesive having the non-depolymerized qualities essential for low aging rate. The pre-formed sheet as such may then be pressure-united with a backing as will be hereinafter described.

Also, the product, as completed, may have a pressure-sensitive adhesive predeterminedly controlled in other respects. For instance, in the case of a pressure-sensitive adhesive containing rubber, our product may have a non-meltable, non-depolymerized adhesive of low thermoplastic qualities, all predeterminedly controlled. If the same adhesive were solvent-laid with one of the ordinary hydrocarbon solvents, the solvent, in depolymerizing the rubber, produces an adhesive layer which tends to creep on an external surface, due to low initial resistance to flow or loss of "nerve" of the rubber constituent. The same depolymerization may give the mass too high thermoplastic qualities.

When rubber is used for an adhesive, therefore, in accordance with our invention, the rubber constituent is present in a state of minimum depolymerization consistent with successful incorporation of plasticizers to secure adequate tack, and the resulting product possesses the additional qualities of resistance to flow and aging desired in an optimum pressure-sensitive adhesive product.

Another advantage of our pressed-on adhesive is that uniform thickness of the sheet on the tape is highly aided by control of the surface tension of the sheet of adhesive during application thereof to the backing. It is known that during evaporation of a volatile solvent, especially if rapid, the solution tends to accumulate itself into droplets and ridges, due to a state of non-equilibrium existing between the rapidity changing surface tension in various areas of the film. This action tends to produce a heavier deposit of solids at points where the solution has so accumulated. These variations in surface tensions occur during the evaporation of the solvent from a solvent-laid adhesive spread, especially when the evaporation of the solvent is rapid, as it usually is.

In our pressed-on sheet of plastic adhesive, the surface tension during application to the backing is uniform, thus avoiding the undesirable tendency of adhesive solids to distribute themselves irregularly, which tendency is present as previously described, when uncontrolled variations and discrepancies in surface tensions are involved.

Also, the thickness of the adhesive sheet in our product is in no way limited by the necessary low viscosity of the solvent dispersed adhesive.

The character of the adhesive in our product also affords a new type of interface for the product between the backing and the adhesive sheet, due to the overlying nature of such adhesive sheet. This interface is characterized by a predominance of what is known in the art as "specific adhesion," as distinguished from the predominating, penetrating type of adhesion intrinsic in solvent-laid adhesives. This results in the provision of an adhesive layer equally attached to each unit of backing, and of uniform thickness, avoiding the non-uniform thickness, and irregularities of adhesion after extension, due to overlappings present in a product employing a previously creped backing. Furthermore, the adhesive does not affect the physical characteristics of the backing, that is, the adhesive sheet is not solvent-laid and does not penetrate, permeate, or impregnate the backing even on the interface portion adjacent the adhesive.

For both of these reasons, commercially desirable thin sheets of pressure-sensitive material may be provided in our product with economy in spread—a given amount of adhesive solids covering more area, with a larger proportion of the adhesive plastically available for application of the product.

In addition, the interface is a factor in the conformability in use of the product. As is evident, merging or intermingling of the adhesive sheet and backing, such as ensues from penetration of an adhesive into a backing, decreases the pliability of the backing. In a solvent-laid adhesive, the interface has tentacle-like adhesive portions permeating the backing, such portions being formed as a result of the comparatively ready flow of the adhesive dispersed in the solvent or other liquid carrier as it wets the backing; and, in the case of some backings, such as cloth, a penetration into the fibres themselves; in either case, with resulting uncontrollable effects upon the pliability of the backing. In our product, the flexural quality of the backing can be retained, unaffected by penetration of the adhesive sheet.

Such independence of the backing and adhesive sheet affords numerous advantages. The backing may be chosen without regard to limitations imposed by the action of a solvent, and the adhesive sheet may be combined with backings or over coatings heretofore commercially impossible with the previous penetrating adhesives. In our product, thinner backings may be used, and such a backing does not require any special unifying treatment. The creping is performed after application of the adhesive, as will be hereinafter seen, when the adhesive sheet, however, is in an elastically relaxed condition, so that the adhesive sheet is made to conform to the paper in a plastic and preferably a thermoset condition, without structural distortion of the paper in creping, and it is unnecessary to provide the strong, and hence expensive papers of the previously creped product. Also, less homogeneous and even porous, perforate, or open-mesh backings may be used in our product, because of the non-penetrating characteristic of the interface.

Likewise, the adhesive sheet may be combined with backings or over coatings which have incorporated therein materials which are injured or affected by the penetrating type of adhesive during application. Thus, it is possible to use combinations of adhesives and backings which would be mutually somewhat soluble in the same solvent, or to use the most economical backing without regard to whether it would be attacked by the most economical solvent. For instance, in the case of a pressure-sensitive adhesive containing rubber, the field of available backings is substantially widened to include such backings as nitro-cellulose-, rubber-, or latex-treated backings.

Other advantages of the invention will be apparent from the description herein, taken together with the drawing in which the figure diagrammatically illustrates, in a general way, apparatus employed in a preferred method of making the product of this invention.

Referring to the drawing, there is shown a three-roll calender group, top, center and bottom rolls, numbered respectively, 2, 4 and 6, the center of said rolls having in contact therewith, as hereinafter more fully described, a doctor blade 8. There is also shown a roll 10 carrying the paper supply from which the paper is led around a roll 12 and between the center and bottom calender rolls 4 and 6. In this method of making the product, the pressure-sensitive adhesive mass, which has already been plasticized, as by kneading or milling, is placed between the slightly spaced top and center calender rolls 2 and 2, where it may be further kneaded or milled to a definite temperature and then extruded or formed into a thin sheet of definite predetermined thickness. The precise spacing of the said rolls is regulated or adjusted in accordance with the thickness to which it is desired to sheet the adhesive material upon the center calender roll. The rolls 2 and 4 are both preferably heated, though to relatively different temperatures. The top roll being heated to say 240° F.±20° and the center roll to 105° F.±50°. By so heating the rolls the relatively high temperature of the top roll serves not only to assist in maintaining the adhesive mass at an elevated temperature, but also prevents adherence of said mass to the top roll so that the mass becomes sheeted in a thin layer of uniform thickness and, once formed upon the moving surface of the center calender roll, thereafter maintains its integrity as a sheet and is carried downwardly towards where the paper backing is applied thereto. At the nip of the center and bottom rolls, there is led between the adhesive layer thus formed and the bottom roll, the strip of paper which, because of the pressure of the bottom roll thereagainst, is caused to tightly adhere to the sheet of adhesive material and continues with it about the moving middle roll to the doctor blade 8. This doctor is not only closely pressed against the roll, as is common in the art, but, in addition, preferably by a suitable electrical resistance unit (not shown) is heated to a somewhat elevated temperature preferably 215° F.±20°, to control and preferably maintain substantially constant the degree of resistance offered by the face of the doctor blade to the movement of the adhesive layer with its paper backing forced thereagainst. Thus the character and result of the operation is controlled not only by the temperature at which the adhesive mass is applied in sheeted form to the center roll, but by the maintenance of the desired temperature by the center roll until the adhesive mass encounters the resistance of the heated doctor blade which, due to its temperature control, is substantially constant and provides a uniform knife or doctor resistance (for any given take-off angle) to the moving layer of adhesive. The doctor resistance is also affected by the angle (ordinarily 90°±20°) between the active surface thereof and the center roll, and this in turn affects the size of the crepe and number per inch of length of the paper. If it is desired to decrease the number of crepes per inch, this can be done by increasing the temperature of the doctor blade and without changing its angle; by increasing the temperature of the middle roll, or both, conversely, if it is desired to increase the number it can be done by decreasing the temperature of the doctor; by decreasing that of the middle roll; or both. Also, crepe size may be varied by changing the take-off angle of the doctor. The degree of tackiness is to some extent regulated by the temperature of the creping knife, and, in general, varies with temperature. Naturally, the pull-off tension on the creped product should be kept low,—just enough to insure removal so as to retain the maximum crepe as imparted to the paper.

In the foregoing specification and in the appended claims, the backing material, for convenience, is referred to simply as "paper," but it will be appreciated that any one of various other thin flexible backings may be employed and therefore the word "paper" in said claims is to be construed as covering other functionally equivalent backings.

This application is a continuation in part of our prior co-pending application, Serial No. 725,424, directed to methods of treatment, manipulation and application to paper (or other thin, flexible backing) of pressure-sensitive adhesive material.

Having described our invention, what we wish to claim and secure by Letters Patent is:

1. As an article of manufacture, a pressure-sensitive adhesive tape comprising a backing sheet of paper having on one side thereof and pressure-united thereto, a preformed sheet of substantially uniform thickness, of a pressure-sensitive material consisting essentially of a plasticized relatively non-depolymerized crude rubber compound, the sheets of combined structure having substantially co-extensive crepings.

2. As an article of manufacture, a pressure-sensitive adhesive tape comprising a backing sheet of paper having on one side thereof an adhesive coat of substantially uniform thickness, of a plasticized relatively non-depolymerized crude rubber compound, the layers of combined structure having substantially co-extensive crepings.

3. As an article of manufacture, a pressure-sensitive adhesive tape comprising in combination, a backing sheet having on one surface thereof and pressed thereon, a preformed plastic adhesive sheet of substantially uniform thickness, of pressure-sensitive material consisting essentially of relatively non-depolymerized dry milled rubber, said combined sheets being creped so that the sheets have substantially co-extensive crepings, and the material is extensible.

4. As an article of manufacture, a pressure-sensitive adhesive tape comprising in combination, two preformed sheets including a backing sheet having on one side thereof and pressure-united therewith, a plastic sheet of pressure-sensitive material of substantially uniform thickness consisting essentially of a heat-plasticized rubbery vinyl polymer, the sheets of combined structure having substantially co-extensive crepings.

5. An an article of manufacture, a pressure-sensitive adhesive tape comprising in combination, a backing sheet having on one surface thereof and pressure-united thereto, a preformed coherent plastic adhesive sheet of substantially uniform thickness, of pressure-sensitive material consisting essentially of a relatively non-depolymerized rubbery vinyl polymer, said combined sheets being creped so that the sheets have substantially co-extensive crepings.

6. As an article of manufacture, a pressure-sensitive adhesive tape comprising a backing layer of paper having on one side thereof an adhesive layer of substantially uniform thickness, of pressure-sensitive material, consisting essentially of a relatively non-depolymerized dry milled rubber and plasticizer, the layers of combined structure having substantially co-extensive crepings.

7. As an article of manufacture, a pressure-sensitive adhesive tape comprising a backing sheet of paper having on one side thereof and pressure united therewith, a preformed sheet of substantially uniform thickness, of pressure-sensitive material, consisting essentially of a relatively non-depolymerized dry milled rubber, rosin and plasticizer compound, the sheets of combined structure having substantially co-extensive crepings.

8. An as article of manufacture, a pressure-sensitive adhesive tape comprising in combination, two preformed sheets including a backing sheet having on one side thereof and pressure-united therewith, a plastic sheet of pressure-sensitive material of substantially uniform thickness consisting essentially of a material chosen from the group consisting of heat-plasticized rubbery vinyl polymers and heat-plasticized rubbery polyalkylene sulfides, the sheets of combined structure having substantially co-extensive crepings.

9. As an article of manufacture, a pressure-sensitive adhesive tape comprising in combination, a backing sheet having on one surface thereof and pressure-united thereto, a preformed coherent plastic adhesive sheet of substantially uniform thickness, of pressure-sensitive material consisting essentially of a material chosen from the group consisting of relatively non-depolymerized rubbery vinyl polymers and relatively non-depolymerized rubbery polyalkylene sulfides, said combined sheets being creped so that the sheets have substantially co-extensive crepings.

10. As an article of manufacture, a pressure-sensitive adhesive tape comprising a backing sheet having on one side thereof and pressure-united thereto, a preformed sheet of substantially uniform thickness of a pressure-sensitive material consisting essentially of a relatively non-depolymerized rubbery halogen substituted butadiene polymer, the sheets of combined structure having substantially co-extensive crepings.

11. As an article of manufacture, a pressure-sensitive adhesive tape comprising a backing sheet having on one side thereof and pressure-united thereto, a preformed sheet of substantially uniform thickness of a pressure-sensitive material consisting essentially of a relatively non-depolymerized rubbery polyalkylene sulfide, the sheets of combined structure having substantially co-extensive crepings.

PAUL F. ZIEGLER.
KARL CEDRIC HOEGLUND.